Dec. 13, 1960   G. T. SMITH   2,964,190
MAGNETIC TRAP FOR ENGINE COOLING SYSTEM
Filed March 10, 1958

George T. Smith
INVENTOR.

BY
ATTORNEY.

United States Patent Office 2,964,190
Patented Dec. 13, 1960

2,964,190

MAGNETIC TRAP FOR ENGINE COOLING SYSTEM

George T. Smith, 2282 Capitol Station, Austin, Tex.

Filed Mar. 10, 1958, Ser. No. 720,468

3 Claims. (Cl. 210—222)

This invention relates to a magnetic trap for an engine cooling system, and it concerns more particularly a magnetic trap for continuously collecting and removing foreign matter from the circulating cooling water, in the cooling system of an internal combustion engine.

In the operation of an internal combustion engine, the efficiency of the radiator is often impaired due to the presence of foreign matter in the circulating cooling water, which tends to plug the tubes of the radiator as well as having an abrasive action on the water pump.

The foreign matter which usually accumulates in a radiator may comprise finely divided particles of carbonaceous as well as ferrous material, including the oxides and hydroxides of iron, mingled with large particles consisting in part of tubercles which are known to be formed on the water side of the engine block, and which ultimately are dislodged therefrom and enter the cooling water stream.

The useful life of the radiator is increased by draining and flushing it at frequent intervals and by the addition of rust inhibiting materials to the cooling water. Some of the larger particles above referred to, however, which are irregularly shaped, tend to become lodged in the tubes of the radiator immediately upon being dislodged from the surfaces of the engine block.

An object of the invention is to provide a trap capable of continuously collecting and removing particles of foreign matter from the circulating stream of cooling water as it leaves the water side of the engine block, and before it enters the radiator, whereby such particles are removed before they have an opportunity to plug the tubes of the radiator.

Another object of the invention is to provide, in an internal combustion engine having a radiator and a flexible conduit removably connected at its ends to the water side of the engine block and the top of the radiator, a permanent magnet disposed within the conduit, adjacent the downstream end thereof, and connected to one end of a supporting strip which is bent at an obtuse angle intermediate its ends whereby the magnet is positioned centrally of the conduit, the opposite end of the strip being hooked over the adjacent end of the conduit and an intermediate portion of the strip being clamped between the conduit and a nipple formed on the radiator.

The invention will be readily understood by referring to the following description and the accompanying drawing, in which.

Figure 1:
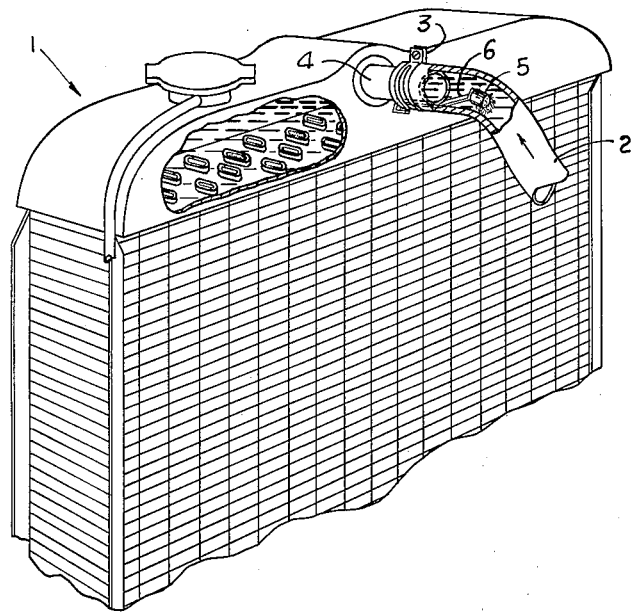
Figure 1 is a fragmentary perspective view, partly broken away, showing a radiator and a flexible conduit connected at one end to the top of the radiator and having a magnetic trap embodying the invention operatively connected therein.
Figure 2:
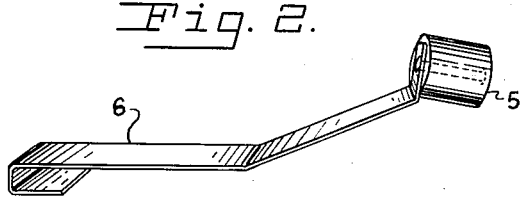
Figure 2 is a perspective view of the magnetic trap.
Figure 3:
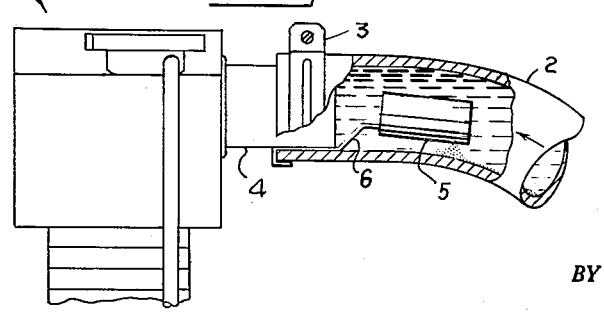
Figure 3 is a fragmentary elevational view, partly in section taken on a median line.

Referring to the drawing, the numeral 1 designates generally the radiator of an internal combustion engine. A flexible conduit 2 is connected at one end, by a clamp 3, to a nipple 4 formed on the radiator 1. The opposite end of the conduit 2 is ordinarily connected to the water side of the engine block (not shown).

A permanent magnet 5, which is round in transverse section, is disposed within the conduit 2, adjacent the downstream end thereof. The magnet 5 is connected to one end of a supporting strip 6, which advantageously may be made of non-ferrous metal such as aluminum or copper, or of plastic material, and which is bent at an obtuse angle intermediate its ends whereby the magnet 5 is positioned centrally of the conduit 2. The opposite end of the strip 6 is hooked over the adjacent end of the conduit 2, and an intermediate portion of the strip 6 is clamped between the conduit 2 and the nipple 4.

In operation, the magnet 5 is capable of collecting foreign matter of the type described from the circulating cooling water flowing through the conduit 2, before the water enters the radiator 1. The magnet 5 preferably is of substantially smaller diameter than the conduit 2, whereby it may be used for a period of time before the foreign matter deposited on the magnet 5 is sufficient to obstruct the flow of water through the conduit 2. The conduit 2 is removably connected to the radiator 1 and to the water side of the engine block, and the magnet 5 may be removed for cleaning, with the conduit 2, at convenient intervals.

The invention may be modified in various ways without departing from the spirit and scope thereof.

What is claimed is:

1. In an internal combustion engine having a radiator and a flexible conduit removably connected at its ends to the water side of the engine block and the top of the radiator, a permanent magnet disposed within the conduit adjacent the downstream end thereof, and connected to one end of a supporting strip which is bent at an obtuse angle intermediate its ends whereby the magnet is positioned centrally of the conduit, the opposite end of the strip being hooked over the adjacent end of the conduit and an intermediate portion of the strip being clamped between the conduit and a nipple formed on the radiator.

2. In an internal combustion engine having a radiator and a flexible conduit connected at one end, by a clamp, to a nipple formed on the radiator adjacent the top thereof, the opposite end of the conduit being connected to the water side of the engine block, a permanent magnet disposed within the conduit, adjacent the downstream end thereof, a supporting strip in the conduit connected at one end to the magnet and having its opposite end hooked over the adjacent end of the conduit, a portion of the strip being clamped between the conduit and the nipple and the strip being bent at an obtuse angle intermediate its ends whereby the magnet is positioned centrally of the conduit.

3. In an internal combustion engine having a water cooled engine block, a radiator having a nipple formed thereon adjacent its top, a flexible conduit connecting the radiator to the water side of the engine block, one end of the conduit surrounding the nipple and being in fluid communication therewith, and a clamp embracing the conduit and the nipple whereby the conduit is clamped to the nipple, a magnetic trap comprising a permanent magnet disposed within the conduit, adjacent the downstream end thereof, and a supporting strip in the conduit connected at one end to the magnet and having its opposite end hooked over the adjacent end of the conduit, a portion of the strip being clamped between the conduit and the nipple and the strip being bent at an obtuse angle intermediate its ends whereby the magnet is positioned centrally of the conduit.

References Cited in the file of this patent

UNITED STATES PATENTS

| | | |
|---|---|---|
| 2,747,501 | Latimer | May 29, 1956 |
| 2,760,636 | Johnson | Aug. 28, 1956 |
| 2,825,464 | Mack | Mar. 4, 1958 |